Oct. 3, 1939.    K. RABE    2,174,996
SPRINGING MEANS FOR VEHICLES
Filed June 6, 1936
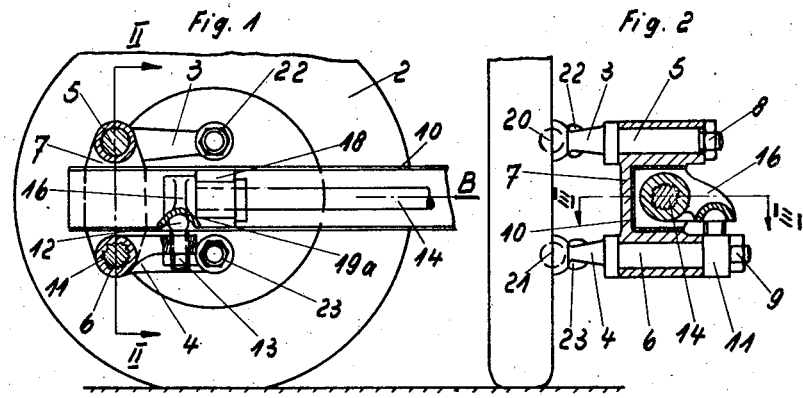
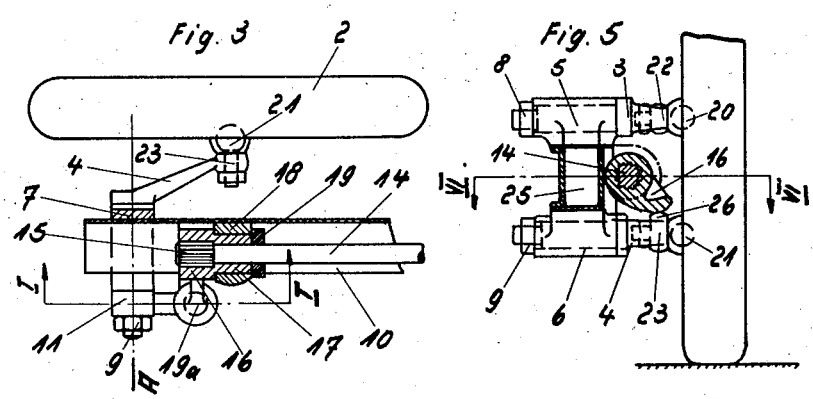
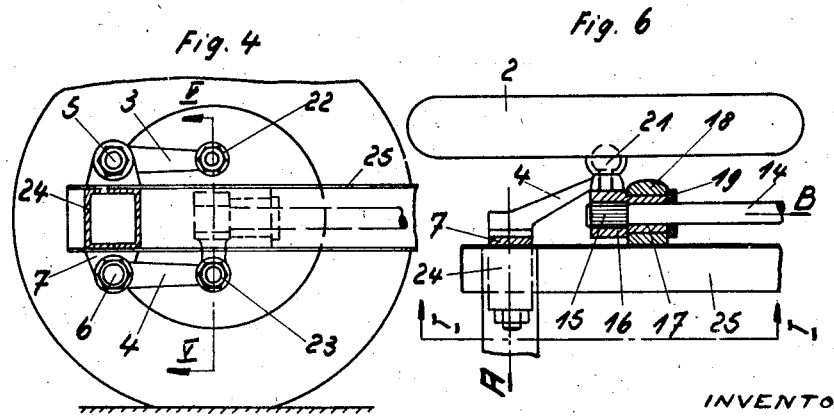
INVENTOR
KARL RABE
BY a. a. Dick
ATTORNEY Patented Oct. 3, 1939

2,174,996

UNITED STATES PATENT OFFICE 2,174,996

SPRINGING MEANS FOR VEHICLES

Karl Rabe, Stuttgart, Germany, assignor to Dr. ing. h. c. F. Porsche, K.-G., Stuttgart-Zuffenhausen, Germany, a company of Germany Application June 6, 1936, Serial No. 83,824 In Germany June 6, 1935

20 Claims. (Cl. 267—57)

This invention is directed to improved springing means for vehicles and is primarily adapted for vehicles having independently sprung wheels.

An object of this invention is the provision of improved means for the springing of wheels of a vehicle relative to the body, chassis, or frame thereof.

Another object of this invention is the provision of springing means for vehicles in which the wheels thereof are independently sprung.

A further object of this invention is the provision of independent and adjustable springing means for the wheels of vehicles.

A more particular object of this invention is the provision of independent and adjustable springing means for the wheels of a vehicle, which takes up a minimum of space but which permits ready access to all parts.

Further objects and advantages of this invention will be apparent from consideration of the specification, as illustrated by the accompanying drawing of possible embodiments of the invention, in which drawing:

Fig. 1 is a side view, partially in cross-section, of a front wheel springing arrangement with torsion springs positioned within a longitudinal frame member;

Fig. 2 is a cross sectional view along the lines II—II of Fig. 1;

Fig. 3 is a cross sectional view along the lines III—III in Fig. 2;

Fig. 4 is a side view, partially in cross-section, of a front wheel springing arrangement with torsion springs positioned on the outside of a longitudinal frame member;

Fig. 5 is a cross sectional view along the lines V—V of Fig. 4; and

Fig. 6 is a cross sectional view along the line VI—VI of Fig. 5.

According to the embodiment of this invention shown in Figs. 1 to 3, a vehicle wheel 2 is supported from the frame of the vehicle by suitable linkage means. This linkage means is illustrated in the form of a parallelogram in which linkage arms 3 and 4, of equal length, lying one above the other, are attached to the wheel 2 at one of their ends by suitable means such as spherical joints 20, 22, and 21, 23, respectively, and at their other ends through respective shaft extensions 5 and 6 to a support 7 which may be attached in any suitable manner to a portion of the vehicle frame shown as a longitudinal frame member 10. In order to hold the shaft members 5 and 6 against axial displacement, means such as nuts 8 and 9 are provided. At one end of one of the shaft members, shown in the preferred embodiment at the end of shaft member 6, is provided an arm 11. This arm is adapted to operate integrally with the shaft 6 and, as shown in Fig. 1, may have a notched inner surface which cooperates with the fluted profile at the end of the shaft member 6. This connecting means disclosed is merely one manner of forming such a connection, but any other means which may occur to those skilled in the art for forming such connection may be employed. At the further end of this short arm 11 is positioned an adjustable means shown as a screw 13 having a spherical end 12.

Positioned within the longitudinal frame member which, as shown in this embodiment, is U-formed is a spring means such as a torsion rod 14. This torsion rod 14 is securely fastened to the frame at one end by suitable means (not shown). At the other end of the torsion rod and integrally fastened therewith is a short arm 16 preferably formed with a trunnion 17 which is journaled within a bearing 18 suitably fastened to the frame. Suitable means such as a nut 19 is used to prevent axial displacement of said torsion bar. At its further end the short lever arm 16 is preferably formed with a socket-shaped depression 19a in which the spherical head 12 on the arm 11 is adapted to engage.

If the wheel 2 of the vehicle strikes a bump or any obstruction it will swing upward on the parallelogram linkage in a plane approximately parallel to the length of the vehicle. This upward swing, transmitted through link 4, will rotate the shaft member 6. Such rotation will, in turn, operate to swing the arm 11 and the spherical end 12 at the end thereof. The spherical end 12 cooperating with the socket 19a of arm 16 will thus tend to turn the torsion spring 14 in such a manner that torsional springing of the vehicle is accomplished.

In order to attain proper operation of this device it will be noted that the arm 16 is in direct power engagement with the knob 12. This is readily brought about by a proper positioning of the parts.

If it is desired to vary the strength of the springing, this may be accomplished by adjusting the screw 13, thus varying the engagement of spherical end 12 in socket 19a.

Applicant does not desire to limit his invention to the specific structure shown. It will be obvious to one skilled in the art that there may be wide latitude in the selection of the length of lever arms 16 and 11. The length of such lever arms, as is readily apparent, will modify the effective springing and such variation is contemplated within the scope of this invention.

The modification shown in Figs. 4, 5, and 6 operates upon the same principle as that shown in the modification described above. Instead of a U-formed longitudinal frame member, this embodiment contemplates the use of a box-like rectangular frame member 25, and the torsion spring 14 is carried on the outside thereof cooperating with the lever arm 16 which, in this instance, is in the form of a cam, as contrasted to the socket end thereof in the above embodiment, and is acted upon by the linkage member directly. If desired, however, a suitable cam bearing surface 23 may be provided on the link. The support 7 in this instance may be attached to the frame at the juncture of the longitudinal frame member 25 with transverse frame member 24.

It will be seen from a study of Figs. 4 to 6 that if the wheel 2 rises for any reason whatsoever, the linkage arm 4 will correspondingly swing upward. Since there is a direct power connection between the arm 4 and the arm 16, preferably through cam track 23, upward movement of the linkage arm will operate directly to twist the torsion bar, thus providing an effective and simple springing means. In this embodiment torsional stresses on the shaft 6 are eliminated and the number of operative parts is reduced, thus producing a saving in operative cost.

Attention is directed to the fact that in applicant's improved springing means the wheel supporting means and the springing means per se form two entirely distinct units. This is of great value in manufacturing, assembling, and replacing of parts. Furthermore, the type of springing used consumes a minimum of space, especially when contrasted with known springing arrangements.

Applicant's concept is not limited to the embodiments above described. It is not important what type or kind of frame members are used. Nor is it important that the axis of rotation of the wheels and the axis of rotation of the spring have the relation disclosed. It will be obvious to one skilled in the art that as long as these axes intersect, the construction shown may be used.

In addition, the terms "frame" or "chassis" as herein used, are not to be understood as limited to such devices when formed separate from the body of coach work of the vehicle, but as including such devices when formed as a part of or integrally interconnected with the body or coach work of the vehicle.

It will be seen that I have provided a construction which satisfies the objects enumerated above, and while I have shown the invention in certain physical embodiments, it is to be understood that modifications of the structure shown may be made by those skilled in this art without departing from my invention as expressed in the following claims.

I claim:

1. In a vehicle, in combination, a frame including a longitudinal U-shaped member, a torsion bar positioned within said member and at one end fastened thereto and at its other end journaled thereto, a lever arm having a socket, fastened to the journaled end of the torsion bar, a wheel, a pair of parallel link members spherically pivoted to said wheel, a support joined to said frame, means for journaling said link members in said support, a second lever arm connected to one of said link members, and adjustable screw means on said second lever arm having a spherical head and engaging the socket in said first lever arm.

2. In a vehicle, in combination, a frame including a U-shaped member, spring means positioned within said member and at one end fastened thereto and at its other end journaled thereto, a lever arm having a socket fastened to the journaled end of the spring means, a pair of link members pivoted to said wheel, a support joined to said frame, means for journaling said link members in said support, a second lever arm connected to one of said link members, and adjustable screw means on said second lever arm engaging the socket in said first lever arm.

3. In a vehicle, in combination, a frame including a U-shaped member, spring means positioned within said member and at one end fastened thereto and at its other end journaled thereto, a lever arm having a socket fastened to the journaled end of said spring means, a wheel, a pair of link members pivoted to said wheel, means for journaling said link members on said frame, a second lever arm connected to one of said link members, and adjustable screw means on said second lever arm engaging the socket in said first lever arm.

4. In a vehicle, in combination, a frame including a U-shaped member, spring means positioned within said member and at one end fastened thereto and at its other end journaled thereto, a lever arm fastened to the journaled end of said spring means, a wheel, a pair of link members pivoted to said wheel, means for journaling said link members on said frame, and means connected to one of said link members and engaging said lever arm.

5. In a vehicle, in combination, a frame including a longitudinal member, spring means positioned within said member and at one end fastened thereto and at its other end journaled thereto, a lever arm fastened to the journaled end of said spring means, a wheel, a pair of link members pivoted to said wheel, means for journaling said link members on said frame, and a second lever arm connected to one of said link members and engaging said first lever arm.

6. In a vehicle, in combination, a frame including a longitudinal member, spring means positioned within said member and at one end fastened thereto, a lever arm having a socket fastened to the other end of said spring means, a wheel, a pair of link members pivoted to said wheel, means for journaling said link members on said frame, a second lever arm connected to one of said link members, and adjustable screw means on said second lever arm engaging the socket in said first lever arm.

7. In a vehicle, in combination, a frame including a U-shaped member, spring means positioned within said member and at one end fastened thereto, a lever arm having a socket fastened to the other end of said spring means, a wheel, a pair of link members pivoted to said wheel, means for journaling said link members on said frame, and means connected to one of said link members and engaging the socket in said lever arm.

8. In a vehicle, in combination, a frame including a U-shaped member, spring means positioned within said member and at one end fastened thereto and at its other end journaled thereto, a lever arm having a socket fastened to the journal end of said spring means, a wheel, a pair of link members pivoted to said wheel, a support joined to said frame, means for journaling said link member in said support, and further means connected to one of said link members and engaging said lever arm.

9. In a vehicle, in combination, a frame including hollow longitudinal and transverse rectangular members, a torsion bar positioned parallel to said longitudinal member and at one end fastened thereto and at its other end journaled thereto, a stub lever connected to the journaled end of said torsion bar, a wheel, a pair of parallel link members spherically pivoted to said wheel, a support joined to said frame at the intersection of said longitudinal and transverse members, means for journaling said link members in said support, and means on one of said link members engaging said stub lever.

10. In a vehicle, in combination, a frame including a longitudinal member, spring means positioned parallel to said longitudinal member and at one end fastened thereto and at its other end journaled thereto, a stub lever connected to the journaled end of said spring means, a wheel, a pair of link members pivoted to said wheel, a support joined to said frame, means for journaling said link members in said support for motion parallel to said longitudinal member, and means on one of said link members engaging said stub lever.

11. In a vehicle, in combination, a frame including a longitudinal beam member, spring means positioned parallel to said longitudinal member and at one end fastened thereto and at its other end journaled thereto, a lever connected to the journaled end of said spring means, a wheel, a pair of link members pivoted to said wheel, means for journaling said link members on said frame for motion parallel to said longitudinal beam member, and means on one of said link members engaging said lever, the reaction of said spring being the sole means for providing positive engagement between said lever and said last means.

12. In a vehicle, in combination, a frame, spring means fastened at one end thereto and at its other end journaled thereto, a stud lever connected to the journaled end of said spring means, a wheel, a pair of link members pivoted to said wheel, means for journaling said link members on said frame for motion substantially parallel to a longitudinal vertical plane of said vehicle, and means on one of said link members engaging said stub lever.

13. In a vehicle, in combination, a frame including a longitudinal member, spring means at one end fastened thereto and at its other end journaled thereto, means connected to the journaled end of said spring means, a wheel, a pair of link members pivoted to said wheel and means for journaling said link members on said frame and engaging said second means.

14. In a vehicle, in combination, a frame including a longitudinal beam member, spring means positioned parallel to said longitudinal member and at one end fastened thereto and at its other end journaled thereto, means connected to the journaled end of said spring means, a wheel, a pair of link members pivoted to said wheel, and means for journaling said link members on said frame for motion parallel to said longitudinal beam member and engaging said second means, the reaction of said spring being the sole means for providing positive engagement between said last two means.

15. In a vehicle having a frame, in combination, a lever, spring means connecting said lever to said frame, a wheel, and means abutting said lever and pivotally connecting said wheel to said frame for motion substantially parallel to a longitudinal vertical plane of said vehicle, the reaction of said spring being the sole means for providing positive engagement between said lever and said last means.

16. The combination according to claim 15 in which said spring means is a torsion bar.

17. In a vehicle having a frame, in combination, a wheel, linkage means for pivotally connecting said wheel to said frame, rotary spring means attached at one end to said frame, and a pair of cooperating cam members respectively attached to the other end of said spring means and to said linkage means, whereby said wheel is resiliently interconnected with said frame.

18. The combination according to claim 17 in which the cam member attached to said spring comprises an arm having a curved bearing surface, and the other cam member comprises a substantially circular bearing surface forming a part of said linkage means.

19. In a vehicle having a frame, in combination, a wheel, linkage means for pivotally connecting said wheel to said frame, rotary spring means extending longitudinally of said vehicle and attached at one end to said frame, and a pair of cooperating cam members respectively attached to the other end of the spring means and to said linkage means, whereby said wheel is resiliently interconnected with said frame.

20. In a vehicle having a frame, in combination, ground engaging means, linkage means for pivotally connecting said ground engaging means to said frame, spring means attached at one end to said frame, and a pair of cooperating cam members respectively attached to the other end of said spring means and to said linkage means, one of said cam members comprising an arm having a substantially spherical socket, and the other cam member comprising an arm having a cooperating spherical head, whereby said ground engaging means is resiliently interconnected with said frame.

KARL RABE.